United States Patent [19]

Whelen

[11] Patent Number: 4,943,152

[45] Date of Patent: Jul. 24, 1990

[54] MANUALLY VARIABLE LIGHT FILTERING SUNGLASSES

[76] Inventor: Richard J. Whelen, 1103 Bandanna Dr., Cincinnati, Ohio 45238

[21] Appl. No.: 277,712

[22] Filed: Dec. 27, 1988

Related U.S. Application Data

[63] Continuation-in-part of Ser. No. 99,107, Sep. 21, 1987, abandoned.

[51] Int. Cl.⁵ .............................................. G02C 7/12
[52] U.S. Cl. ................................... 351/49; 351/47; 351/57
[58] Field of Search ................... 351/49, 57, 47, 85, 351/159, 177

[56] References Cited

U.S. PATENT DOCUMENTS

| | | |
|---|---|---|
| 2,005,426 | 7/1935 | Land . |
| 2,251,330 | 9/1941 | Fairbank . |
| 2,565,362 | 3/1951 | Eloranta . |
| 2,813,459 | 5/1957 | Archambault . |
| 3,869,200 | 3/1975 | Danylewich ......................... 351/85 |
| 3,944,346 | 10/1975 | Shindler . |
| 4,102,566 | 4/1978 | Shelton . |
| 4,119,369 | 2/1978 | Eloranta et al. . |
| 4,149,780 | 4/1979 | Young . |
| 4,196,982 | 12/1980 | Watkins . |
| 4,386,832 | 7/1983 | Nannini . |

FOREIGN PATENT DOCUMENTS

754841 3/1967 Canada ................................ 351/49

Primary Examiner—Paul M. Dzierzynski
Attorney, Agent, or Firm—Wood, Herron & Evans

[57] ABSTRACT

Variable density sunglasses comprise a frame with a pair of rim portions, each rim portion having sidewalls and first and second interior grooves formed therein between the sidewalls. A pair of first lenses are fixed mounted in the first grooves. A pair of second lenses can be threadably mounted into or demounted from the second grooves along thread planes that are defined by access channels, each access channel extending from a second groove to one of the sidewalls. Each second lens has a circular periphery and a cut extending radially inwardly from the periphery to define two thread edges. The thread edges enable the lenses to be inserted into the respective channels for rotational mounting. Once mounted, rotaation of the second lenses within the second grooves allows the density of light passing through the aligned first and second lenses to be varied.

30 Claims, 1 Drawing Sheet

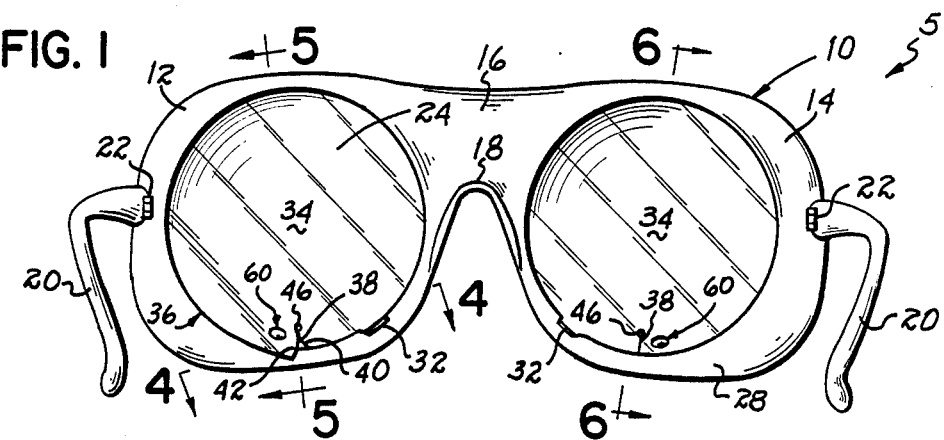
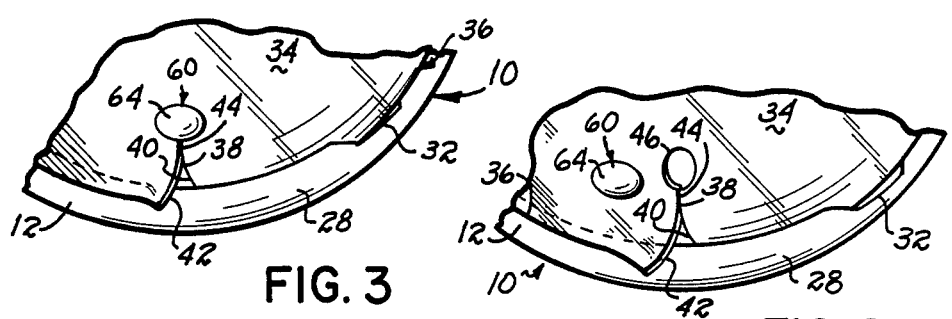
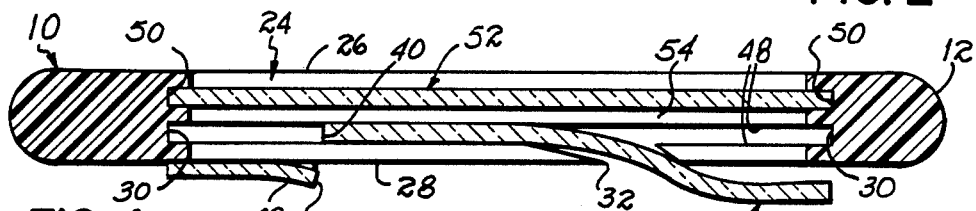
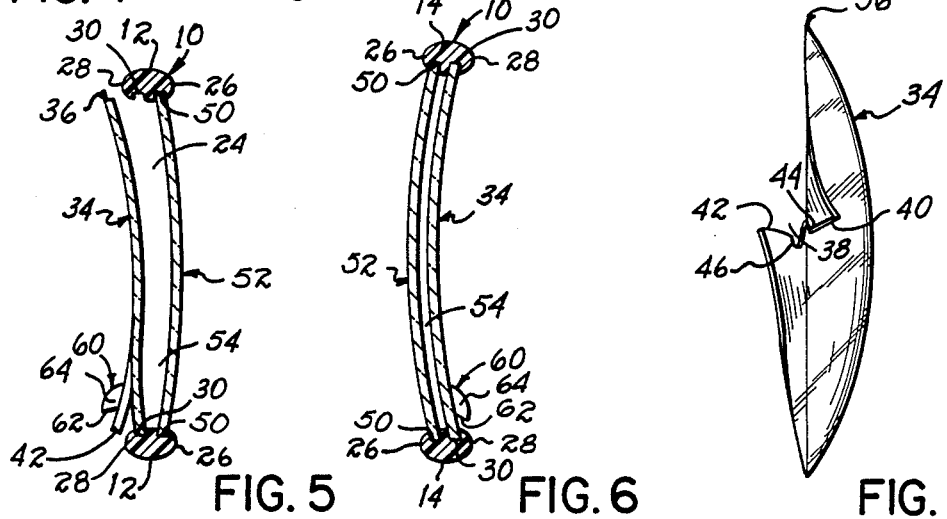

MANUALLY VARIABLE LIGHT FILTERING SUNGLASSES

RELATED APPLICATIONS

This application is a continuation-in-part of my earlier copending application by the same title, application Ser. No. 07/099,107, filed Sept. 21, 1987, now abandoned.

BACKGROUND OF THE INVENTION

I. Field of the Invention

The present invention relates to sunglasses having two pair of polarized lenses mounted to the eyeglass frame, wherein the lenses of each pair of lenses are rotatable relative to one another in order to vary the intensity of light there is transmitted to the wearer. In particular, the present invention relates to sunglasses which permit ready mounting, demounting and adjusting of at least one lens of each pair of lenses.

II. Description of the Prior Art

How many times on a super bright and beautiful day have you noticed yourself squinting to screen out some additional sun rays even though you had on your sunglasses? How many times on a slightly overcast day have you wished you brought your lightly tinted sunglasses along instead of your darkly tinted ones?

One solution has been to provide lenses for the sunglasses which appear to change from light to dark automatically. However, such lenses are typically slow to react and, thus, are not always desired. Another solution involves the use of rotatable pairs of polarizing lenses in the lens-receiving holes of each rim portion of the eyeglass frame.

It is well known that rotating a light polarizing lens in front of or behind a second, fixed position, light polarizing lens will cause the amount of light transmitted through the pair of lenses to vary between little or no light transmitted to maximum light transmitted for every ninety degrees of rotation which occurs. When both light polarizing lenses are in phase or parallel to one another, the transmitted light passing through is said to be linearly and horizontally polarized (or linearly and vertically polarized). At this point, maximum light may be transmitted but as the light polarizing lenses are rotated out of phase or approaching right angles with one another the percentage of light being transmitted through the pair of lenses decreases proportionately with the amount of rotation, possibly all the way down to zero when the light polarizing lenses are at right angles to one another.

While pairs of polarized lenses have been incorporated into sunglasses in order to allow the user to vary the amount of sunlight passing through to the wearer, such sunglasses have certain drawbacks. For example, the frames of sunglasses of this type are often complex and bulky. In some cases, the rotational movement of the lenses requires complex structure be built into the sunglasses making them bulky, perhaps difficult to use, and often restricting rotational movement of the lenses to less than 90°. In yet other situations, a rotatable lens is supported merely by lugs or tabs spaced about the sunglasses. Such an approach may not close the periphery around the pair of lenses so as to avoid accumulation of foreign material or dirt between the lenses. Also, such an approach may not hold the rotatable lens securely enough to prevent inadvertent rotation thereof. Further, in some cases both lenses of each pair have been non-removably built into the frame whereby a user could not readily remove one lens from each pair such as for cleaning or replacement.

SUMMARY OF THE INVENTION

The present invention overcomes the drawbacks of the prior art sunglasses. In particular, the present invention provides a unique system for mounting and demounting rotatable lenses to an eyeglass frame. The invention also facilitates rotation of the lenses when mounted, without requiring the complexity or bulk that is typically encountered in prior art variable density sunglasses. In its broadest sense, the prevent invention provides an interior groove surrounding a lens-receiving hole in each rim portion of an eyeglass frame, and an access channel extending to a sidewall of the eyeglass frame so that the groove may communicate to the eyeglass frame exterior. The groove and associated access channel provide a thread plane for threadably receiving a rotatable lens within the rim portions.

Also, in its broadest sense, the present invention provides a lens adapted to be threadably mounted to the groove via the access channel. To this end, the lens is provided with a cut extending radially inwardly from the periphery to define two thread edges. The lens is mounted to the groove by inserting one of the thread edges into the channel and then rotating the lens until the second thread edge passes through the access channel whereby the entire periphery of the lens will be within the groove. Preferably, the groove which receives the rotatable lens, and the rotatable lens itself, are circular whereby to promote easy rotation of the rotatable lens.

In a preferred embodiment, the thread edges are permanently flared or biased in opposite axial directions so that, once mounted, the edges frictionally engage the inside walls of the groove to prevent unwanted rotation of the lens with respect to the rim portion. Further preferably, in order to relieve stress to the cut lens such as may be caused by relative movement of the thread edges as they are squeezed towards one another by the groove walls, the internal end or terminus of the cut is provided with a rounded opening.

In a preferred embodiment, each rim portion also has a second groove generally parallel the first and in which another lens is fixedly mounted. Preferably, all of the lenses are polarized such that rotation of the rotatable lens within the groove relative the fixedly mounted lens enables the wearer to change the intensity of light that passes through the pair of lenses, i.e., to provide a variable density ocular unit over each eye of the wearer.

To facilitate rotational control, each of the rotatable lenses preferably includes an adjustment tab projecting from the surface thereof. The tabs permit the rotatable lens to be rotated in its groove by exerting finger pressure against the surface of the tab. Where the rotatable lens is positioned towards the wearer's face, the tab projects towards the face. Under these circumstances, to reduce possible injury to the wearer in the event of an accident or the like, the rear surface of the tab is preferably rounded or spherical in shape. To facilitate handling of the lens, a bottom portion of each adjustment tab may be bevelled to provide a gripping surface whereby to grab the lens for easy removal from the eyeglass frame, for example.

To avoid unwanted light from migrating through the rotating lens at its rounded opening, the adjustment tab is preferably located over the opening. Further, because the grooves are side by side within each rim portion, the periphery of each pair of lenses is substantially enclosed by the rim portion to reduce the likelihood of foreign material becoming entrained between the lenses.

The present invention thus provides a pair of glasses by which rotating lenses are easily and readily mounted, demounted and adjusted without the complexity or bulk or other drawbacks encountered in the prior art.

These and other objects and advantages of the present invention will become more readily apparent from the accompanying drawings and the description thereof.

BRIEF DESCRIPTION OF THE DRAWINGS

The accompanying drawings, which are incorporated and constitute a part of this specification, illustrate preferred embodiments of the invention and, together with the general description given above, and the detailed description of the embodiments given below, serve to explain the principles of the invention.

FIG. 1 is a rear elevation of a pair of eyeglasses in accordance with the principles of the present invention, the right rear lens being completely mounted within the right rim portion of the eyeglass frame and the left rear lens being in the "insertion stage" of mounting to the left rim portion of the frame;

FIG. 2 is an enlarged partial view of the left rear lens and the left rim as shown in FIG. 1 and showing a first embodiment of a rotating lens according to the principles of the present invention;

FIG. 3 is an enlarged partial view similar to FIG. 2 of a second embodiment of a rotating lens according to the principles of the present invention;

FIG. 4 is an enlarged cross sectional view taken on lines 4—4 of FIG. 1;

FIG. 5 is an enlarged cross sectional view taken on lines 5—5 of FIG. 1;

FIG. 6 is an enlarged cross sectional view taken on lines 6—6 of FIG. 1; and

FIG. 7 is an enlarged side view of a rotating lens for a left rim portion.

DETAILED DESCRIPTION OF THE DRAWINGS

With reference to FIG. 1 there is illustrated a pair of variable density sunglasses 5. Glasses 5 are illustrated with an exemplary eyeglass frame 10 for purposes of explaining the principles of the present invention. Although the invention is not so limited, frame 10 is preferably a plastic molded body including a left rim portion 12 and a right rim portion 14 coupled together by a bridge structure 16 on which is also defined a nose piece support structure 18. To hold frame 10 to the wearer's face (not shown), folding side bows 20 are hingedly coupled to rim portions 12 and 14 by side bow hinges 22 as is conventional.

As is typical, each rim portion 12 and 14 surrounds a lens-receiving hole 24 generally in a plane parallel the front and back of frame 10 as defined between forward 26 and rearward facing 28 exterior sidewalls, respectively. Preferably, each rim portion 12, 14 has at least one interior groove 30 formed therein between sidewalls 26, 28 and surrounding lens-receiving hole 24. Each groove 30 is preferably circular and communicates with exterior sidewall 28 via an access channel 32 to define a thread plane for purposes of threadably receiving a rotatable lens 34, the particulars of which will be explained by reference to FIG. 7.

As seen in FIG. 7, lens 34 preferably has a circular periphery 36 to engagingly mate with circular groove 30. To permit threading engagement with groove 30 via access channel 32, lens 34 is provided with a cut 38 extending radially inwardly from periphery 36 to define thread edges 40, 42 on either side of cut 38. As shown in FIG. 7, thread edges 40 and 42 are preferably permanently flared in opposite axial directions for purposes to be described hereafter. For purpose of left rim portion 12, and as seen in FIG. 7, thread edge 40 and the adjacent area of lens 34 is flared outwardly towards the front of lens 34 while thread edge 42 and the adjacent area of lens 34 is flared inwardly beyond the back of lens 34. Thread edges 40, 42 are flared in the reverse fashion (not shown) for purposes of right rim portion 14.

Preferably the internal end 44 of each cut 38 communicates with a rounded, stress relieving aperture 46 formed through lens 34. Rounded aperture 46 distributes fatiguing or internal stress that results from flaring of edges 40, 42 and their compression in use as will be described. Each flex cut 38 (at the time of "cutting in" to the lens during manufacture and before the lens edges are permanently flared) is preferably about 0.010 inches in width and about 0.250 inches in height, the top 0.075 inches of which comprises the round opening 46.

Mounting of lens 34 will be described with reference to mounting lens 34 as shown in FIG. 7 to left rim portion 12. To this end, edge 40 of lens 34 is inserted into access channel 32 and lens 34 rotated clockwise. As lens 34 rotates, more of periphery 36 of lens 34 becomes engaged within groove 30 (see FIGS. 4 and 5, for example) until edge 42 passes through channel 32 and into groove 30 whereupon the entire periphery 36 of lens 34 will become completely received within groove 30. A lens 34 is shown so-received in right rim portion 14 in FIG. 6. To remove or demount lens 34, it is merely rotated in a reverse or opposite direction from the mounting direction so that edge 42 first passes out through access channel 32.

Lenses 34 are preferably convex discs of pliable plastic. During manufacture, edges 40, 42 of lens 34 are permanently flared adjacent to the flex cut 38, as shown in FIG. 7. Because of the pliability and resiliency of the lens, these permanently flared edges aid the wearer in the removal and remounting of the lens by naturally leading the lens in and out of groove 30 via access channel 32. Edges 40, 42 are preferably flared further apart than the width of groove 30 between its walls 48 so that when periphery 36 is entirely within groove 30, edges 40, 42 will be squeezed together thereby. That is, once lens 34 is completely mounted within its groove 30, permanently flared edges 40, 42 will produce a pressure against groove walls 48 as a result of being constricted thereby. The coaction of edges 40, 42 and walls 48 provides frictional engagement between the lens and the groove walls to assist in holding the lens in any desired set position and prevent unwanted rotational movement of the lens 34 with respect to frame 10.

With the foregoing arrangement, a rotatable lens may be readily mounted and demounted to an eyeglass frame. Further, and in connection with providing variable density sunglasses in accordance with the invention, each rim portion of the eyeglass frame 10 is further provided with a second groove 50 outboard of and generally parallel groove 30. Preferably, fixedly secured within outer groove 50 is a polarized eyeglass lens 52. As is typical for sunglasses, each of lenses 52 is preferably lightly tinted and mounted in a non-rotatable fashion with respect to the frame 10. Also, forward lenses 52 are preferably convex discs of pliable plastic, rigid plastic, or optical glass as is conventional. In mounting lenses 52, it is preferable to position the lenses such that the light polarizing direction or angle of each lens 52 is parallel to the other and that the polarized, transmitted light of these lenses is linear and horizontal with respect to the normal worn position of the frame 10.

To function as variable light filtering or variable density sunglasses, lenses 34 are also preferably polarized. Hence, once lenses 34 are in groove 30, lenses 34 may be rotated or adjusted to vary the total light intensity transmitted through each aligned pair of lenses 34, 52. Preferably, grooves 50, 30 are spaced approximately 0.03 inches apart to define an air gap or space 54 between each lens pair 34, 52. Air space 54 constitutes a buffer zone between the lenses of each pair of front and rear lenses 52, 34 that prevents frictional scratching between the surfaces of the lenses during adjustment. Further, grooves 50, 30 are preferably completely circumscribed by the plastic of their associated rim portion 12 or 14 to thus surround the periphery of both lenses 34, 52 associated with that rim portion. In this manner, the air gap 54 is substantially enclosed so as to reduce the likelihood of foreign material getting into gap 54 when the glasses 5 are in use.

As stated earlier, removal of lens 34 is accomplished simply by rotating lens 34 in a direction opposite its mounting direction, causing edge 42 to pass into access channel 32 and eventually the entire periphery 36 of lens 34 to unthreadably pass through access channel 32. Where necessary, this simple, threadable mounting and demounting of the rear lenses 34 facilitates the cleaning of the inside surfaces of each pair of aligned lenses 34, 52. This simple process also permits easy replacement of a rotatable lens 34 should such be necessary.

When used as variable light transmitting sunglasses, rotational adjustment of lenses 34 may be accomplished by use of adjustment tabs 60 mounted to lens 34 by a rivet, glue or other fastening means (not shown). Preferably, adjustment tabs 60 are mounted to an exterior surface of lens 34 facing the wearer (not shown). According to the embodiment shown in FIG. 3, adjustment tab 60 is preferably located over aperture 46 so as to occlude light which might otherwise pass through lens 34 at aperture 46. Alternately, tabs 60 may be positioned away from the cut 38 and aperture 46 as shown in FIGS. 1 and 2. As shown in FIGS. 5 and 6, adjustment tabs 60 are preferably bevelled on a bottom side as at 62 to facilitate removal of lens 34 from frame 10 by providing a gripping surface by which to grab the lenses. Preferably, rearwardly directed surfaces 64 of adjustment tabs 60 are spherical in shape, in order to reduce the likelihood of injury to the wearer's eyes (not shown) in the event that the sunglasses 10 are accidentally compressed against the wearer's face.

In a preferred embodiment, flex cuts 38 are positioned in lenses 34 such that when cuts 38 are located at a bottommost position, at six o'clock with respect to the frame 10 (as seen in FIG. 1), the polarizing directions or angles of all of the front and rear lenses 34, 52 are parallel to each other, and in a linear and horizontal light polarizing position.

With this positioning of the lenses and the flex cuts with respect to the frame, the following will occur: As left rear lens 34 is rotated clockwise ninety degrees and right rear lens 34 is rotated counterclockwise ninety degrees (by applying appropriate finger pressure to adjustment tabs 60) such that the adjustment tabs progress toward their 9:00 and 3:00 positions, respectively, the left ocular unit (composed of rim portion 12 and its associated pair of lenses 34, 52) and the right ocular unit (composed of rim portion 14 and its associated pair of lenses 34, 52) will vary between transmitting the maximum amount of polarized light and transmitting a minimum amount or no light to the wearer-viewer (not shown). By rotating rear lenses 34 to the desired position, the ocular units of the sunglasses may be adjusted to filter out any desired percentage of light. This adjustment may be easily performed while the sunglasses are worn and may be varied for one ocular unit independent of the adjustment for the other ocular unit.

Additional advantages and modifications will readily appear to those skilled in the art. The present invention in its broader aspects is, therefore, not limited to the embodiments and illustrated examples shown and described. Accordingly, departures may be made from such details and/or without departing from the spirit or scope of the present invention.

I claim:

1. An eyeglass frame for readily mounting and demounting a rotatable lens comprising:
    at least one rim portion having exterior sidewalls defining a front and back to the eyeglass frame, the rim portion having a lens-receiving hole situated between the front and back of the frame;
    a groove formed about the lens-receiving hole and in the rim portion between the sidewalls;
    an access channel in the rim portion extending between and to the groove and one of the sidewalls to define a thread plane for threadably receiving a rotatable lens into and out of the groove whereby the lens may be readily mounted to and demounted from the eyeglass frame by rotation thereof.

2. The eyeglass frame of claim 1 wherein said groove defines a circle.

3. An eyeglass lens to be threadably, rotatably received in an eyeglass frame comprising:
    a lens having a periphery;
    a cut in the lens extending radially inwardly from the periphery to define a pair of edges on either side of the cut, said edges being flared apart in an opposite axial direction such that one edge is displaceable relative the other edge in order to be initially receivable in a thread plane of an eyeglass frame so that upon rotation of the lens relative the frame the entire periphery of the lens and the other edge will pass through the thread plane and into a groove in the eyeglass frame communicating with the thread plane.

4. The eyeglass lens of claim 3 further comprising an adjustment tab mounted to the lens whereby to facilitate rotation of the lens relative the eyeglass frame.

5. The eyeglass lens of claim 3 wherein said periphery is circular.

6. An eyeglass lens to be threadably, rotatably received in an eyeglass frame comprising:
    a lens having a periphery;
    a cut in the lens extending radially inwardly from the periphery to define a pair of edges, said edges being permanently flared apart in opposite axial directions.

7. An eyeglass lens to be threadably, rotatably received in an eyeglass frame comprising:
a lens having a periphery;
a cut in the lens extending radially inwardly from the periphery to define a pair of edges being flared apart in opposite axial direction, and a stress relieving aperture at a terminal end of the cut.

8. The eyeglass lens of claim 7 further comprising an adjustment tab mounted to the lens whereby to facilitate rotation of the lens with the eyeglass frame.

9. The eyeglass lens of claim 8 wherein the adjustment tab is mounted over the stress relieving aperture.

10. The eyeglass lens of claim 8 wherein the adjustment tab is mounted spaced away from the stress-relieving aperture.

11. Sunglasses comprising:
a frame;
a rim portion in the frame having exterior sidewalls defining a front and back to the frame, the rim portion surrounding a lens-receiving hole situated between the front and back of the frame;
first and second substantially parallel grooves formed in the rim portion between the sidewalls, the second groove being generally circular in shape;
a first lens affixed in the first groove; and
an access channel formed in the rim portion between the second groove and one of the exterior sidewalls to define a thread plane for threadably receiving a rotatable circular second lens into and out of the second groove within the rim portion.

12. The sunglasses of claim 11 further comprising:
a circular second lens having a circularly shaped periphery and a cut extending radially inwardly from the periphery to define two thread edges, one of the thread edges adapted to be initially threadably received in the access channel and upon rotation of the lens the entire periphery of the lens and the other edge will pass through the access channel and into the second groove whereby to enable threadable mounting of the second lens to the frame by rotation of the second lens.

13. The sunglasses of claim 12 wherein the thread edges are permanently flared in opposite axial directions further apart than sidewalls of the second groove, whereby the thread edges frictionally engage the sidewalls of the second groove when the second lens is fully mounted therein.

14. The sunglasses of claim 12 further comprising stress relief means formed within said lens at a terminus of the cut whereby to prevent the spreading of stress from the cut over the second lens.

15. The sunglasses of claim 14 wherein the stress relief means comprises a rounded opening through the second lens located at an internal end of the cut.

16. The sunglasses of claim 15 further comprising:
an adjustment tab projecting from a surface of the second lens to facilitate rotation of the second lens within the second groove, the tab being mounted to the lens over the rounded opening to occlude the passage of light therethrough.

17. The sunglasses of claim 12 wherein the first and second lenses are light polarizing whereby relative rotation between the lenses varies the amount of light cooperatively transmitted by the lenses.

18. The sunglasses of claim 17 wherein the first lens is mounted to have a polarization angle relative the frame, the cut in the second lens being located therein such that when the cut is at a six o'clock position with respect to the frame, the second lens will be mounted at a polarization angle relative the frame equal to the polarization angle of the first lens such that light polarization through the lenses will be substantially parallel.

19. The sunglasses of claim 12 further comprising:
an adjustment tab projecting from a surface of the second lens, the tab facilitating rotation of the second lens within the second groove.

20. The sunglasses of claim 19 wherein the adjustment tab is spaced away from the cut.

21. The sunglasses of claim 19 the adjustment tab having a surface projecting away from a surface of the second lens, said tab surface being spherical in shape whereby to reduce the likelihood of injury to a wearer of an eyeglass frame containing the lens.

22. The eyeglass lens of claim 19, the adjustment tab having a lower, bevelled surface whereby to permit a user to hold the second lens by gripping the adjustment tab.

23. The sunglasses of claim 11 wherein the first and second grooves are substantially uniformly spaced apart whereby to provide a buffer region therebetween.

24. A pair of sunglasses comprised of a molded plastic frame having a left and right rim, two folding side bows, two side bow hinges, a molded-in nose piece system, and a bridge structure; a front light polarizing lens in each rim; and a rear light polarizing lens in each rim spaced adjacent the front lens in that rim, each rear lens being a pliable, resilient, round, convex disc of plastic between 0.025 and 0.030 inches thick in which its edge possesses one flex cut being a quarter inch in length allowing the lens to be inserted into its associated rim in a threading-like process via an access channel and allowing the lens to be removed in a reverse, threading-like process.

25. The sunglasses of claim 24, each rear lens being lightly tinted.

26. A pair of sunglasses comprised of a molded plastic frame having a left and right rim, two folding side bows, two side bow hinges, a molded-in nose piece system, and a bridge structure; a front light polarizing lens in each rim; and a rear light polarizing lens in each rim spaced adjacent the front lens in that rim, each rear lens having a flex cut with permanently flared edges in order to aid the wearer in removing and remounting the rear lens and in order to provide frictional engagement to lock the lens in any desired set position and in which each flex slot has a rounded opening at its top in order to distribute stresses in that area to a broader area.

27. A pair of sunglasses comprised of a molded plastic frame having a left and right rim, two folding side bows, two side bow hinges, a molded-in nose piece system, and a bridge structure; a front light polarizing lens in each rim; and a rear light polarizing lens in each rim spaced adjacent the front lens in that rim, each rear lens equipped with adjustment tabs to assist a wearer in rotating the rear lens and in which a rim side of the adjustment tab is bevelled to assist the wearer in removing the lens from its associated rim and in which the adjustment tab has a spherically shaped surface in order to prevent damage to the wearer's eyes and face.

28. An eyeglass lens to be threadably, rotatably received in an eyeglass frame comprising:
a lens having a periphery;
a cut in the lens extending radially inwardly from the periphery to define a pair of edges whereby one edge is initially receivable in a thread plane of an eyeglass frame and upon rotation of the lens relative the frame, the entire periphery of the lens and the other edge will pass through the thread plane; and an adjustment tab connected to the lens whereby to facilitate rotation of the lens relative the eyeglass.

29. The eyeglass lens of claim 28, the adjustment tab having a bevelled surface to permit a user to hold the lens by gripping the adjustment tab.

30. The eyeglass lens of claim 28, the adjustment tab having a surface projecting away from a surface of the lens, said tab surface being spherical in shape whereby to reduce the likelihood of injury to a wearer of an eyeglass frame containing the lens.

* * * * *